(12) United States Patent
Ota et al.

(10) Patent No.: US 9,509,180 B2
(45) Date of Patent: Nov. 29, 2016

(54) BRUSHLESS MOTOR FOR ELECTRIC POWER TOOL

(75) Inventors: Kenichi Ota, Anjo (JP); Masanori Higashi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 426 days.

(21) Appl. No.: 13/980,495

(22) PCT Filed: Nov. 28, 2011

(86) PCT No.: PCT/JP2011/077300
§ 371 (c)(1),
(2), (4) Date: Jul. 26, 2013

(87) PCT Pub. No.: WO2012/101893
PCT Pub. Date: Aug. 2, 2012

(65) Prior Publication Data
US 2014/0001890 A1 Jan. 2, 2014

(30) Foreign Application Priority Data
Jan. 26, 2011 (JP) .................. 2011-013802

(51) Int. Cl.
*H02K 1/02* (2006.01)
*H02K 1/30* (2006.01)
*H02K 1/27* (2006.01)

(52) U.S. Cl.
CPC .............. *H02K 1/02* (2013.01); *H02K 1/2733* (2013.01); *H02K 1/30* (2013.01)

(58) Field of Classification Search
CPC .......... H02K 1/278; H02K 1/28; H02K 1/02; H02K 1/30; H02K 1/2733
USPC ........... 310/156.08, 156.11, 261.1, 60 A, 61, 310/156.13, 156.14, 43
See application file for complete search history.

(56) References Cited

U.S. PATENT DOCUMENTS

| | | | |
|---|---|---|---|
| 3,246,187 A | 4/1966 | Iemura | |
| 3,482,156 A | 12/1969 | Porath | |
| 5,710,474 A * | 1/1998 | Mulgrave | ................ H02K 1/12 310/156.25 |
| 6,503,415 B1 | 1/2003 | Arai | |
| 6,765,319 B1 * | 7/2004 | Thompson | ............ H01F 1/0578 310/156.08 |
| 7,642,689 B2 * | 1/2010 | Suzuki | ................. H02K 1/2733 310/125 |
| 8,299,661 B2 * | 10/2012 | Jeung | ................... H02K 1/2733 310/156.08 |
| 2003/0173924 A1 * | 9/2003 | Blase | ..................... F02M 37/08 318/538 |
| 2007/0052310 A1 | 3/2007 | Sakai et al. | |

(Continued)

FOREIGN PATENT DOCUMENTS

| | | | | |
|---|---|---|---|---|
| CH | WO 2009000599 A1 * | 12/2008 | ........... | H02K 1/2733 |
| CN | 1265512 A | 9/2000 | | |

(Continued)

OTHER PUBLICATIONS

Effects of Resin content on the properties of PPS. http://www.sciencedirect.com/science/article/pii/S037877530702647X.*

(Continued)

*Primary Examiner* — Quyen Leung
*Assistant Examiner* — Noli Manaloto
(74) *Attorney, Agent, or Firm* — Oliff PLC

(57) ABSTRACT

A brushless motor for the electric power tool is configured such that a rotor having a magnet is radially disposed on the inner side of a stator having winding wires, and a bonded magnet is used as the magnet of the rotor.

23 Claims, 11 Drawing Sheets

(56) References Cited

U.S. PATENT DOCUMENTS

| | | | |
|---|---|---|---|
| 2008/0048517 A1* | 2/2008 | Ochiai | H02K 1/278 310/216.004 |
| 2008/0218007 A1* | 9/2008 | Masuzawa | H01F 1/0578 310/44 |
| 2009/0001826 A1 | 1/2009 | Suzuki et al. | |
| 2009/0108694 A1 | 4/2009 | Hanai | |
| 2010/0052457 A1* | 3/2010 | Brahmavar | H02K 1/2733 310/156.13 |
| 2010/0163266 A1 | 7/2010 | Matsunaga et al. | |
| 2010/0181859 A1* | 7/2010 | Hirai | H01F 41/0266 310/156.13 |
| 2011/0273037 A1 | 11/2011 | Ota et al. | |

FOREIGN PATENT DOCUMENTS

| | | |
|---|---|---|
| CN | 101767328 A | 7/2010 |
| CN | 102244449 A | 11/2011 |
| DE | 10 2004 034176 A1 | 2/2006 |
| JP | A-59-159652 | 9/1984 |
| JP | H04-21160 U | 2/1992 |
| JP | U-5-50956 | 7/1993 |
| JP | H07-123677 A | 5/1995 |
| JP | H08-9573 A | 1/1996 |
| JP | H09-56092 A | 2/1997 |
| JP | H09-56095 A | 2/1997 |
| JP | H10-112946 A | 4/1998 |
| JP | H10-201152 A | 7/1998 |
| JP | 2000-252110 A | 9/2000 |
| JP | 2001-178040 A | 6/2001 |
| JP | A-2004-48827 | 2/2004 |
| JP | 2007-074888 A | 3/2007 |
| JP | 2007-306703 A | 11/2007 |
| JP | 2007-318889 A | 12/2007 |
| JP | 2008-160973 A | 7/2008 |
| JP | A-2009-112158 | 5/2009 |
| JP | 2010-155291 A | 7/2010 |
| JP | A-2010-269396 | 12/2010 |

OTHER PUBLICATIONS

WO 2009000599 A1 English Translation.*
Jan. 6, 2015 Japanese Office Action issued in Application No. 2012-554626.
Apr. 3, 2015 Office Action issued in Chinese Patent Application No. 201180066172.3.
International Search Report issued in International Patent Application No. PCT/JP2011/077300 mailed Mar. 6, 2012.
Feb. 25, 2016 European Search Report issued in European Application No. 11857250.2.
Sep. 9, 2015 Office Action issued in Japanese Application No. 2012-554626.

* cited by examiner

BRUSHLESS MOTOR FOR ELECTRIC POWER TOOL

BACKGROUND OF THE INVENTION

1. Field of the Invention

The present invention relates to a brushless motor for an electric power tool configured such that a rotor having a magnet is radially disposed on the inner side of a stator having winding wires.

2. Description of the Related Art

An example of a brushless motor for the electric power tool is disclosed in Japanese Laid-Open Patent Publication No. 2010-269396.

In the brushless motor for the electric power tool disclosed in Patent Document 1, a rotor having a magnet is radially disposed on the inner side of a stator having winding wires. The outer peripheral surface of the rotor is covered with a thin sintered neodymium magnet that is formed in a cylindrical shape.

SUMMARY OF THE INVENTION

Problems to be Solved by the Invention

However, since the sintered magnet is used in the rotor in the above-mentioned brushless motor for the electric power tool, there is a problem that the brushless motor becomes more expensive than a motor using, for example, a bonded magnet or the like.

There is a need to reduce manufacturing costs of a brushless motor for an electric power tool.

SUMMARY OF THE INVENTION

One construction for a brushless motor for an electric power tool can include a rotor having a magnet is radially disposed on the inner side of a stator having winding wires. Further, a bonded magnet is used as a magnet of the rotor.

According to another construction, the bonded magnet is used as the magnet of the rotor. The bonded magnet is formed by mixing fine magnet particles with a binder such as resin and by molding and solidifying the mixture. And, the bonded magnet is more inexpensive than a general sintered magnet.

For this reason, it is possible to reduce manufacturing costs of the brushless motor for the electric power tool.

According to another construction, the number of poles is configured to be eight or less.

That is, since the number of poles is eight or less, the diameter of the rotor can be made small, which is advantageous when the rotor is rotated at a high speed.

According to another construction, the rotor includes a shaft and a bonded magnet that is radially disposed on the outer side of the shaft.

That is, since portions other than the shaft can be formed of the bonded magnet, it is possible to make a thickness of the bonded magnet in the radial direction relatively large. For this reason, it is possible to increase the volume of the magnet per unit length as compared to a structure in which a cylindrical core (iron core) is provided on the outside of the shaft and the surface of the core is covered with a cylindrical sintered magnet. For this reason, it is possible to compensate for a defect of the bonded magnet that a magnetic force of the bonded magnet is smaller than that of a sintered magnet, by increasing the volume of the bonded magnet.

According to another construction, the rotor includes a shaft, a cylindrical core that is radially disposed on the outer side of the shaft and is made of a material through which magnetic flux easily passes, and a cylindrical bonded magnet that is radially disposed on the outer side of the core. Further, the thickness of the bonded magnet in the radial direction is configured to be larger than that of the core in the radial direction.

According to another construction, the bonded magnet is magnetized so as to have polar anisotropy.

Accordingly, magnetic flux generated between an N pole and an S pole that are adjacent to each other passes through the inner portion of the bonded magnet. For this reason, magnetic flux does not concentrated on the core or the shaft that is radially positioned on the inner side of the bonded magnet. And thus, it is possible to prevent reduction of a magnetic force caused by saturation of the magnetic flux According to another construction, a through hole into which the shaft, or the shaft and the core, are inserted is axially formed at the center of the bonded magnet, and a resin is filled between an inner peripheral surface of the through hole and an outer peripheral surface of the shaft or between the inner peripheral surface of the through hole and the outer peripheral surface of the core.

According to another construction, an inner wall surface of the through hole of the bonded magnet, and the outer peripheral surface of the shaft or the outer peripheral surface of the core are shaped such that rotation of the shaft or the core with respect to the bonded magnet is prevented through the resin.

According to another construction, the through hole of the bonded magnet is formed so as to have a polygonal cross-section.

For this reason, the bonded magnet is not easily displaced with regard to the shaft or the core in the circumferential direction According to another construction, the bonded magnet is isotropic so as to be magnetized in any direction, and the bonded magnet is magnetized such that magnetic fields are obtained in a direction perpendicular to an outer peripheral surface of the bonded magnet and also in a direction perpendicular to an axial end surface of the bonded magnet.

That is, magnets by which magnetic fields are generated in the direction perpendicular to the outer peripheral surface can be integrated with magnets by which magnetic fields are generated in the direction perpendicular to the axial end surface. Thus, it is possible to lower costs by reducing the number of parts.

According to another construction, a plurality of grooves that extend in an axial direction are formed on the inner wall surface of the through hole of the bonded magnet at regular intervals in a circumferential direction, and the number of the grooves is configured to be equal to or larger than the number of poles of the bonded magnet.

Since a plurality of grooves extending in the axial direction are formed on the inner wall surface of the through hole of the bonded magnet in the circumferential direction as described above, the resin filled in the through hole is engaged with the grooves in the circumferential direction. Accordingly, rotation of the bonded magnet with regard to the resin is prevented.

Further, the number of the grooves is configured to be equal to or larger than the number of poles of the bonded magnet. For this reason, even if the grooves are not positioned with regard to the bonded magnet, the grooves are permitted to dispose inside the magnetic poles in the circumference direction. That is, since there is no magnetic pole in which the groove is not disposed, a problem that the intensities of the magnetic fields of the magnetic poles might vary due to an influence of the grooves does not easily occur.

According to another construction, the grooves are formed so as to have an arc-shaped cross-section.

In this way, each groove does not have a sharp corner. Accordingly, when a molten resin is pressed into the through hole of the bonded magnet, the pressure of the resin does not converge on one point. Thus, the bonded magnet is not easily broken.

According to another construction, the grooves are formed so as to have a substantially square cross-section.

For this reason, the grooves of the bonded magnet are easily engaged with the resin in the circumferential direction, and thus it is ensured that rotation of the bonded magnet with respect to the resin is prevented.

According to another construction, a depth of the groove is configured to be larger than 0.1 mm and smaller than 0.2×[a radius (mm) of the through hole of the bonded magnet].

Accordingly, it is possible to minimize an influence of the grooves on the magnetic field of the bonded magnet.

According to another construction, the number of poles of the bonded magnet and the number of the grooves are configured to be four and six, respectively.

According to another construction, surface roughness of the inner wall surface of the through hole of the bonded magnet is configured to be larger than that of the outer peripheral surface of the bonded magnet.

For this reason, even if the grooves are not formed on the inner wall surface of the through hole of the bonded magnet, it is possible to prevent rotation of the bonded magnet with respect to the resin that is filled in the through hole.

According to another construction, a resin block is provided on the outside of the shaft in the radial direction such that rotation of the resin block with regard to the shaft is prevented, and an axial end surface of the resin block is engaged with an axial end surface of the bonded magnet in a circumferential direction.

That is, it is possible to prevent rotation of the bonded magnet with regard to the shaft through the resin block.

Effect of the Invention

According to the above, manufacturing costs of the brushless motor for the electric power tool can be reduced.

DETAILED DESCRIPTION OF THE INVENTION

[Embodiment 1]

Figure 1:
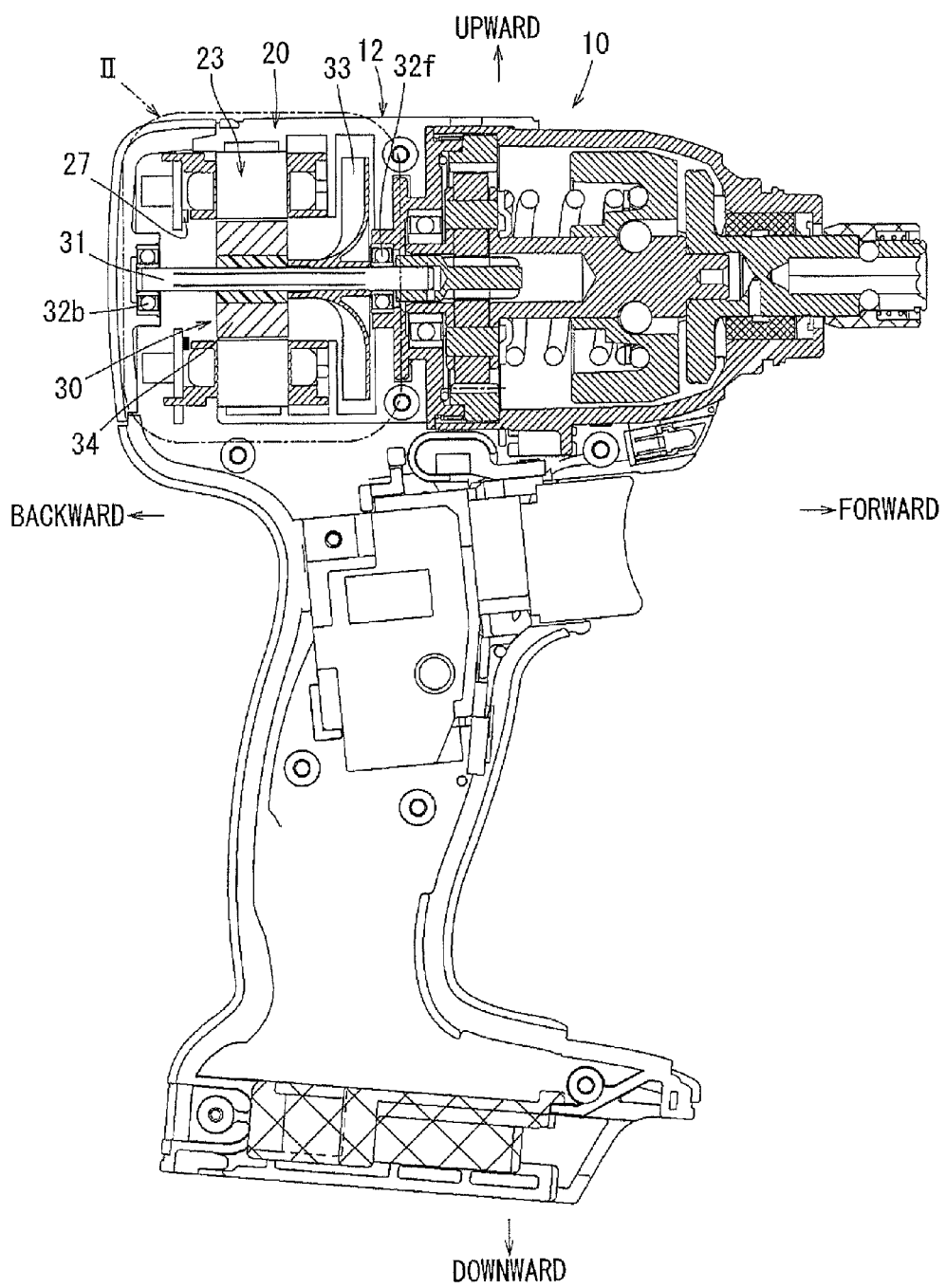
FIG. 1 is a longitudinal sectional view of an electric power tool that includes a brushless motor according to an embodiment 1 of the present invention.

A brushless motor for an electric power tool according to an embodiment 1 of the present invention will be described below with reference to FIG. 1 to FIG. 9. A brushless motor 20 for the electric power tool according to this embodiment is used as a drive source of an impact driver 10, and is housed in a rear part of a housing body 12 of the impact driver 10 as shown in FIG. 1.

Here, the front side, the rear side, the left side, the right side, the upper side, and the lower side in the drawings correspond to the front side, the rear side, the left side, the right side, the upper side, and the lower side of the impact driver 10.

<Outline of the Brushless Motor 20 for the Electric Power Tool>

Figure 2:
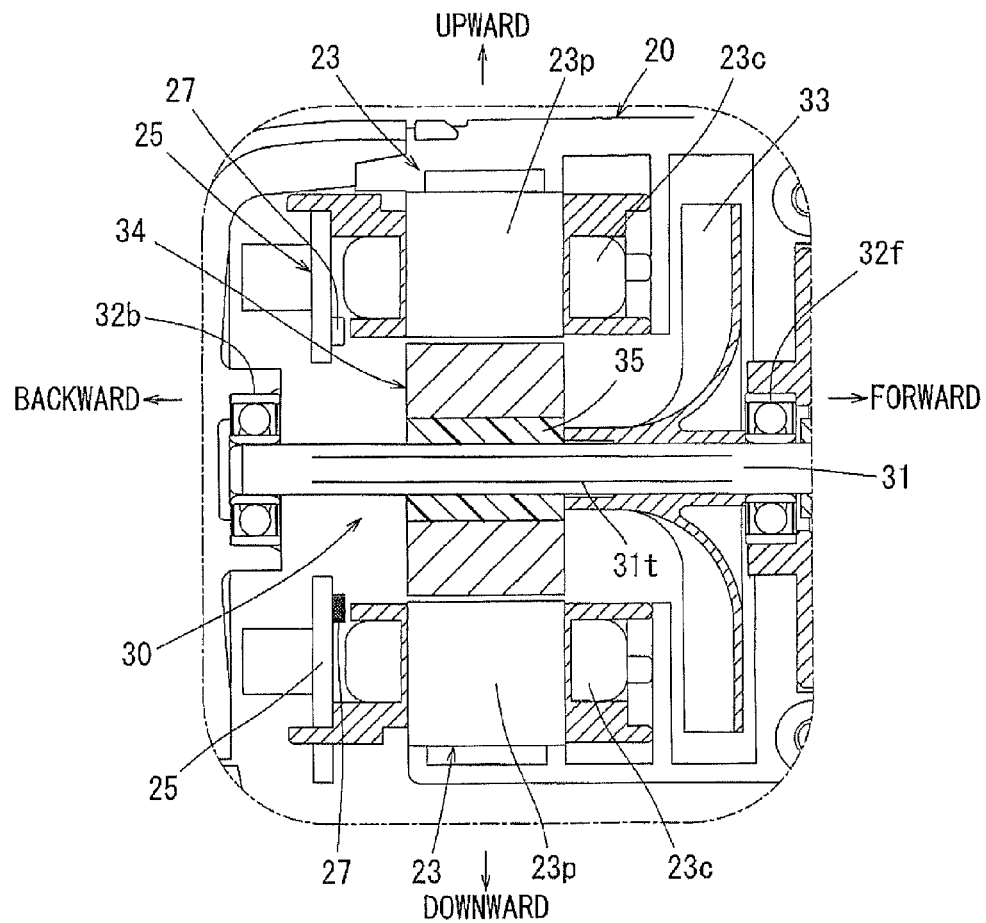
FIG. 2 is a longitudinal sectional view of the brushless motor for the electric power tool (an enlarged view of a portion indicated by an arrow II in FIG. 1).

As shown in FIG. 2, the brushless motor 20 for the electric power tool includes a stator 23 having drive coils 23c (winding wires) and also includes a rotor 30 that is radially disposed on the inner side of the stator 23.

The stator 23 includes a cylindrical body (not shown) and six tooth portions 23p that protrude inward from the inner peripheral surface of the tubular body in the radial direction. The drive coils 23c are wound around the tooth portions 23p through insulating members, respectively.

Further, a ring-shaped electrical circuit board 25 is mounted on the rear end portion of the stator 23 so as to be coaxial with the stator 23, and three magnetic sensors 27, which detect the positions of the magnetic poles of the rotor 30, are disposed on the surface (front surface) of the electrical circuit board 25 at an interval of 120 degrees in the circumferential direction.

As shown in FIG. 1 and FIG. 2, both ends of a shaft 31 of the rotor 30 are supported by the housing body 12 with bearings 32f and 32b such that the rotor 30 is coaxial with the stator 23. Further, a fan 33 for cooling the motor is coaxially mounted on the front portion of the shaft 31 that protrudes forward from the stator 23.

The brushless motor 20 for the electric power tool is configured to rotate the rotor 30 by sequentially applying electric current to each drive coils 23c of the stator 23 by use of a motor driving circuit (not shown) while the positions of the magnetic poles of the rotor 30 are being detected by the magnetic sensors 27.

<About the Rotor 30>

Figure 3:
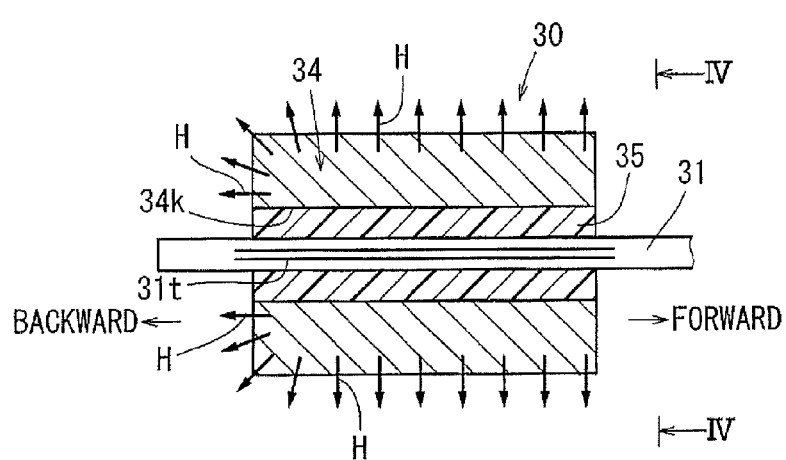
FIG. 3 is a schematic longitudinal sectional view of a rotor of the brushless motor for the electric power tool.
Figure 4:
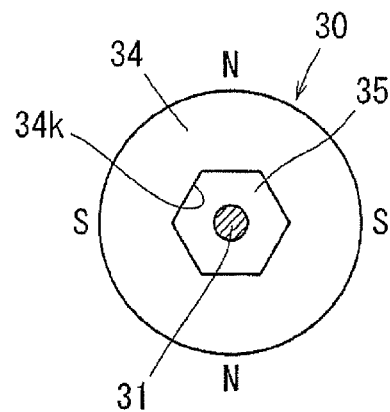
FIG. 4 is a view seen along arrows IV-IV in FIG. 3.

As shown in FIG. 3 and FIG. 4, the rotor 30 includes the shaft 31 and a bonded magnet 34 having a substantially columnar shape. The bonded magnet 34 is formed by mixing fine magnet particles with a binder such as resin and by molding and solidifying the mixture. In addition, the bonded magnet has a high degree of freedom of shaping and can be manufactured with high dimensional accuracy. As shown in FIG. 4, a through hole 34k having a hexagonal cross-section is formed and disposed at the center of the bonded magnet 34 extending in the axial direction. Further, the shaft 31 is coaxially inserted into the through hole 34k of the bonded magnet 34, and resin 35 is filled between the inner wall surface of the through hole 34k and the outer peripheral surface of the shaft 31. That is, the bonded magnet 34 and the shaft 31 are set in a molding die (not shown) while being held coaxially with each other, and the resin 35 is injected into the through hole 34k of the bonded magnet 34. Accordingly, the bonded magnet 34 and the shaft 31 are integrated with each other by use of the resin 35.

Here, for example, polyester or the like is used as the resin.

Since the through hole 34k of the bonded magnet 34 is formed so as to have a hexagonal cross-section as described above, the resin 35 filled in the through hole 34k of the bonded magnet 34 is also formed in the shape of a hexagonal column. Accordingly, rotation of the bonded magnet 34 with regard to the resin 35 can be prevented. Further, as shown in FIG. 3, there are formed protrusions 31t that extend on the surface of the shaft 31 in the axial direction, and thus it is also ensured that rotation of the shaft 31 with regard to the resin 35 can be prevented.

The bonded magnet 34 of the rotor 30 is an isotropic magnet in which drive magnets and position detecting magnets of the brushless motor 20 for the electric power tool are integrated with each other. The drive magnets used to drive the brushless motor 20 are permanent magnets of which the directions of magnetic fields H are perpendicular to the outer peripheral surface of the rotor 30. That is, the directions are the same as the radial direction of the rotor 30. The position detecting magnets, which are used such that the magnetic sensors 27 detect the positions of the magnetic poles of the rotor 30, are permanent magnets of which the directions of magnetic fields H are perpendicular to the rear end surface of the rotor 30. That is, the directions are the same as the axial direction of the rotor 30.

Since the bonded magnet 34 is isotropic as described above, it is possible to easily magnetize the bonded magnet in two directions (radial direction and axial direction).

<About how to Magnetize the Bonded Magnet 34>

The bonded magnet 34 is magnetized such that four poles are obtained, and N poles and S poles are formed at an interval of 90 degrees in a circumferential direction. Here, since the bonded magnet 34 is isotropic, it is possible to magnetize the bonded magnet in a desired direction by applying a magnetic field to the bonded magnet from the outside.

Figure 5:
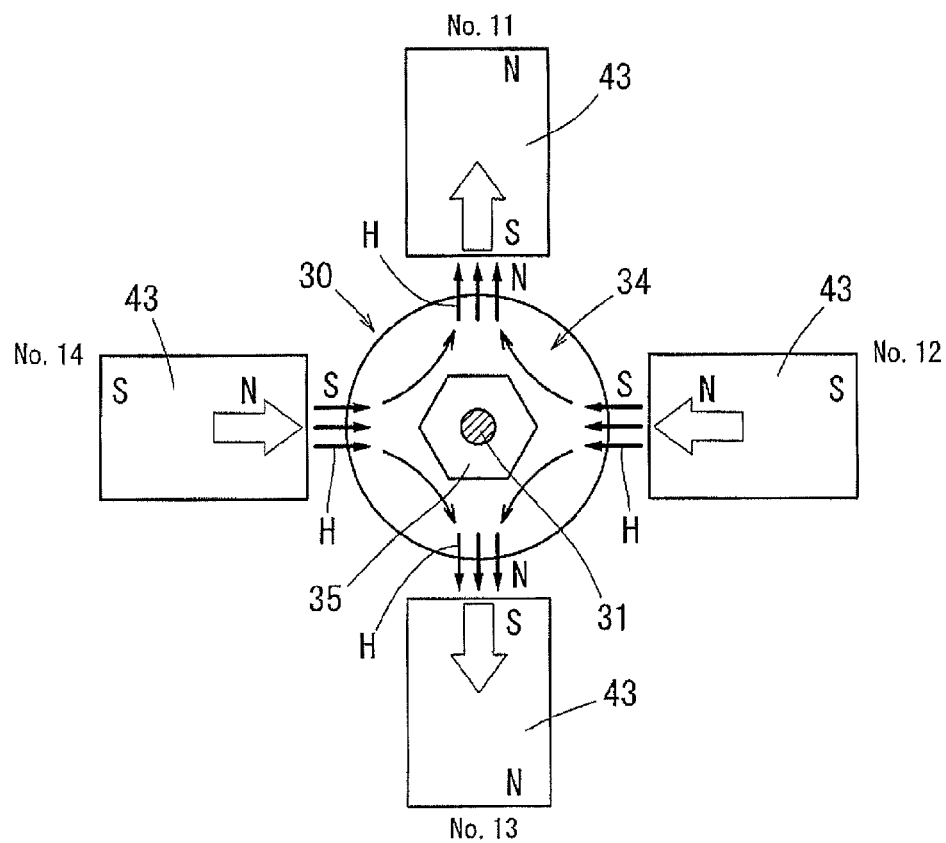
FIG. 5 is a schematic front view showing how to magnetize drive magnet portions.

First, how to magnetize drive magnet portions of the bonded magnet 34 will be described with reference to FIG. 5 and FIG. 6.

To magnetize the drive magnet portions, four magnetic field coils 43 (No. 11, No. 12, No. 13, and No. 14) are disposed around the bonded magnet 34 at an interval of 90 degrees in the circumferential direction and a magnetic field is applied to the outer peripheral surface of the rotor 30 in a direction perpendicular to the outer peripheral surface of the rotor 30 (in the radial direction). In this case, electric current flows through the magnetic field coils 43 such that the magnetic fields of the adjacent magnetic field coils 43 are generated in an opposite direction to each other. Accordingly, as shown in FIG. 6, magnetization is performed such that polar anisotropy is achieved. That is, magnetic flux generated between the N pole and the S pole that are adjacent to each other passes through the inside of the bonded magnet 34. For this reason, magnetic flux does not converge on the shaft 31 that is radially positioned on the inner side of the bonded magnet 34, and thus it is possible to prevent reduction of a magnetic force caused by saturation of the magnetic flux.

Figure 7:
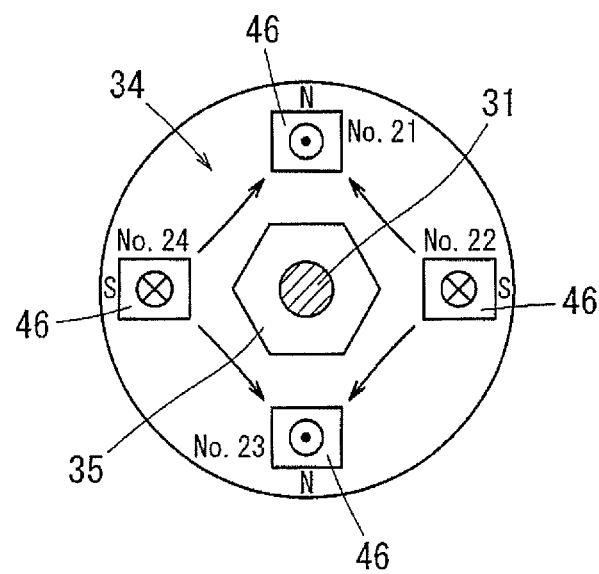
FIG. 7 is a schematic front view showing how to magnetize position detecting magnet portions.
Figure 8:
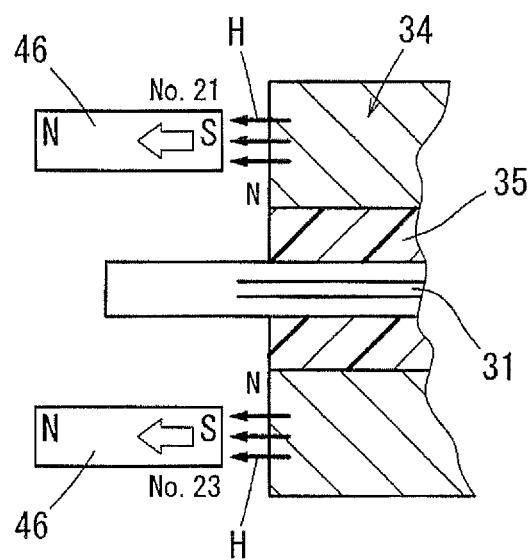
FIG. 8 is a partially schematic side view showing how to magnetize the position detecting magnet portions.

Next, to magnetize the position detecting magnet portions, as shown in FIG. 7 and FIG. 8, four magnetic field coils 46 (No. 21, No. 22, No. 23, and No. 24) are disposed near the rear end surface of the bonded magnet 34 at an interval of 90 degrees and a magnetic field perpendicular to the rear end surface of the rotor 30 (in the axial direction) is applied. In this case, electric current flows through the magnetic field coils 46 such that the magnetic fields of the adjacent magnetic field coils 46 are generated in an opposite direction to each other. In this way, the position detecting magnet portions can be magnetized.

Here, the No. 22 magnetic field coil 46 and the No. 24 magnetic field coil 46 are not shown in FIG. 8.

As described above, it is possible to obtain the bonded magnet 34 in which the drive magnets and the position detecting magnets are integrated with each other.

<Advantages of the Brushless Motor 20 for the Electric Power Tool According to the Present Embodiment>

According to the brushless motor 20 for the electric power tool of this embodiment, since the bonded magnet 34 is used as the magnet of the rotor 30, the brushless motor 20 of this embodiment is more inexpensive than a general brushless motor that uses a sintered magnet. For this reason, manufacturing costs of the brushless motor 20 for the electric power tool can be reduced.

Further, since the number of the poles of the brushless motor 20 for the electric power tool is configured to be four, the diameter of the rotor 30 can be made small, which is advantageous when the rotor 30 is rotated at a high speed.

Further, since portions other than the shaft 31 can be formed of the bonded magnet 34, the thickness of the bonded magnet 34 in the radial direction can be made relatively large. For this reason, the volume of the magnet per unit length can be increased as compared to a structure in which a cylindrical core (iron core) is provided on the outside of the shaft 31 and the surface of the core is covered with a cylindrical sintered magnet. Accordingly, it is possible to compensate for a defect of the bonded magnet 34 that a magnetic force of the bonded magnet 34 is smaller than that of the sintered magnet by increasing the volume of the bonded magnet 34.

Figure 6:
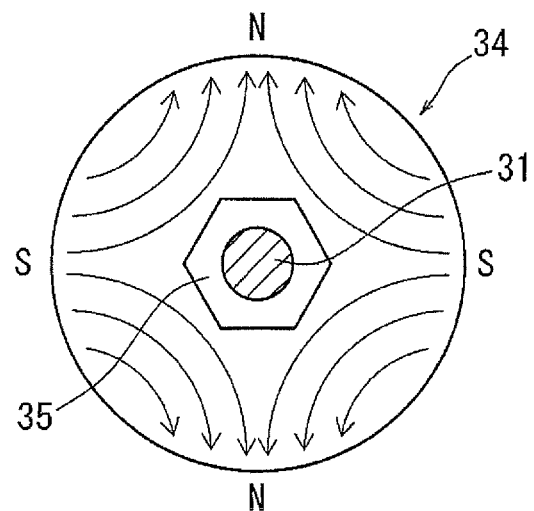
FIG. 6 is an enlarged view of the rotor in FIG. 5.

In addition, since the bonded magnet 34 is magnetized so as to have polar anisotropy as shown in FIG. 6, magnetic flux generated between the N pole and the S pole that are adjacent to each other passes through the inner portions of the bonded magnet 34. For this reason, the magnetic flux does not converge on the shaft 31 that is radially positioned on the inner side of the bonded magnet 34, and thus it is possible to prevent reduction of a magnetic force caused by saturation of the magnetic flux.

Further, the inner wall surface of the through hole 34k of the bonded magnet 34 and the outer peripheral surface of the shaft 31 are shaped such that the rotation of the shaft 31 with regard to the bonded magnet 34 can be prevented by the filled resin 35. For this reason, the shaft 31 is not displaced with regard to the bonded magnet 34 in the rotational direction over time. Further, since the through hole 34k of the bonded magnet 34 is formed so as to have a hexagonal cross-section, the resin 35 filled in the through hole 34k of the bonded magnet 34 is formed in the shape of a hexagonal column. And thus, it is ensured that the rotation of the bonded magnet 34 with regard to the resin 35 can be prevented.

Further, the bonded magnet 34 has a structure in which the drive magnets and the position detecting magnets are integrated with each other, and thus it is possible to lower costs by reducing the number of parts. In addition, it is also possible to prevent a problem that the resin 35 filled in the through hole 34k of the bonded magnet 34 might penetrate into a gap between drive magnets and position detecting magnets in case the drive magnets and the position detecting magnets are formed separately from each other.

<Modifications>

Figure 9:
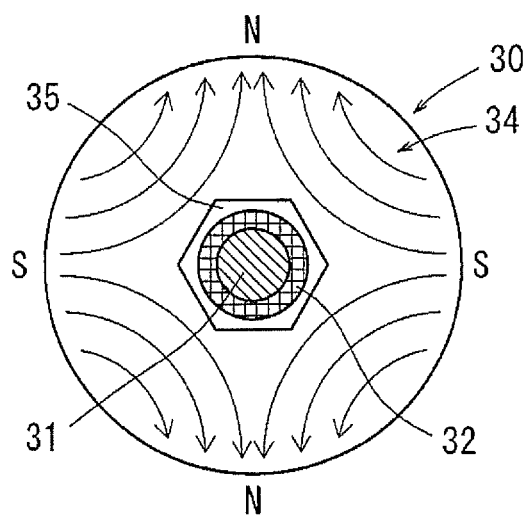
FIG. 9 is a schematic front view showing a rotor of a brushless motor for the electric power tool according to a modified embodiment of the present invention.

Here, the present invention is not limited to the above-mentioned embodiment, and may be modified without departing from the scope of the invention. The above-described embodiment shows that the rotor 30 includes the bonded magnet 34 and the shaft 31. However, as shown in FIG. 9, a cylindrical core 32, which is made of iron and has a thickness sufficiently smaller than the thickness of the bonded magnet in the radial direction, may be provided between the bonded magnet 34 and the shaft 31. That is, even if the cylindrical core 32 made of iron is provided, the volume of the bonded magnet 34 per unit length can be increased.

Further, the above-described embodiment shows that magnetization is performed using the isotropic bonded magnet 34 such that polar anisotropy can be achieved. However, it is also possible to perform magnetization by using an anisotropic bonded magnet such that orientation of magnets is performed and polar anisotropy is achieved.

Further, the bonded magnet 34 having four poles was exemplified in this embodiment. However, the number of poles of the bonded magnet 34 may be appropriately changed to eight or less.

Further, the embodiment shows that the through hole 34k of the bonded magnet 34 is formed so as to have a hexagonal cross-section. However, the through hole 34k of the bonded magnet 34 may also be formed so as to have a quadrilateral cross-section, a pentagonal cross-section, or the like.

Further, the embodiment shows that the protrusions 31t that extend in the axial direction are formed on the outer peripheral surface of the shaft 31. However, the shaft 31 may be formed so as to have a quadrilateral cross-section, a pentagonal cross-section, a hexagonal cross-section, or the like.

[Embodiment 2]

A brushless motor for the electric power tool according to an embodiment 2 of the present invention will be described below with reference to FIG. 10 to FIG. 20. The brushless motor for the electric power tool according to the embodiment 2 improves a structure that prevents rotation of the bonded magnet 34 with regard to the shaft 31 of the rotor 30, and other structures thereof are the same as those of the brushless motor according to the embodiment 1. For this reason, the same members as those of the brushless motor according to the embodiment 1 will be denoted by the same reference numerals and the description thereof will be omitted.

Figure 11:
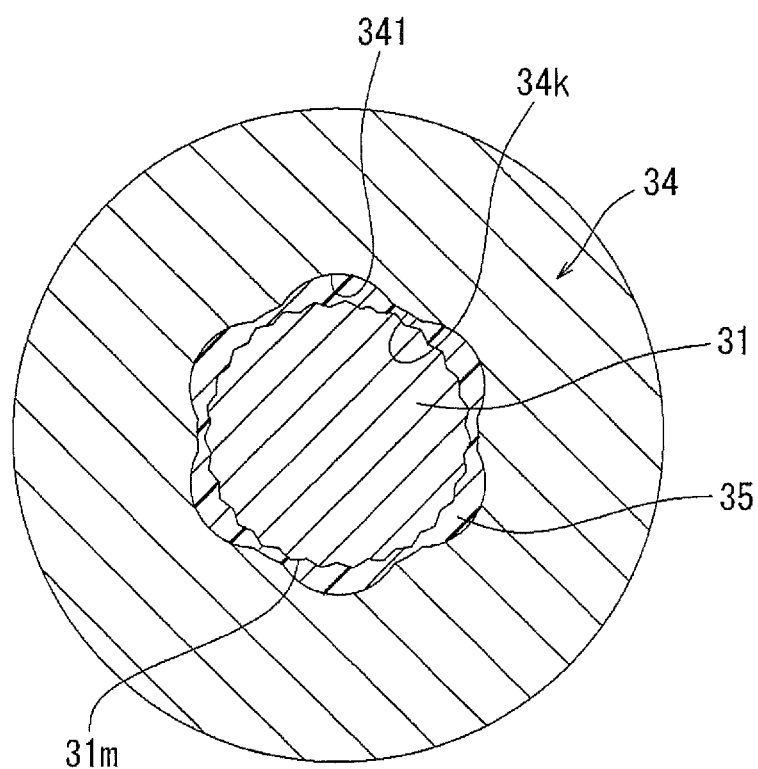
FIG. 11 is a cross-sectional view showing a structure that prevents rotation of a bonded magnet (a sectional view taken from line XI-XI of FIG. 10).

As shown in FIG. 11, six shallow grooves 34l, which have an arc-shaped cross-section and extend in the axial direction, are formed on the inner wall surface of a circular through hole at regular intervals in the circumferential direction, such that a through hole 34k of the bonded magnet 34 has a substantially flower-shaped cross-section.

Here, it is preferable that the depth of the groove 34l be configured to be larger than 0.1 mm and smaller than 0.2×[a radius (mm) of the through hole of the bonded magnet]. This will minimize an influence of the grooves 34l on the magnetic field of the bonded magnet 34.

Figure 10:
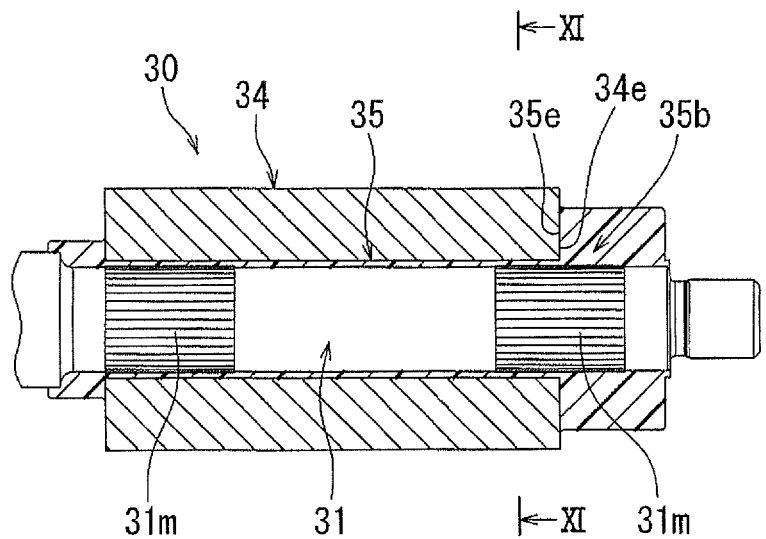
FIG. 10 is a schematic longitudinal sectional view of a rotor of a brushless motor for the electric power tool according to an embodiment 2 of the present invention.

In addition, on the shaft 31 that is inserted into the through hole 34k of the bonded magnet 34, there is formed roulette 31m, which are formed of a plurality of fine grooves extending in the axial direction, are formed around both the axial end portions of the bonded magnet 34, as shown in FIG. 10.

Then, the resin 35 is filled in (pressed into) a space between the shaft and the through hole 34k of the bonded magnet 34.

In this way, the shallow grooves 34l extending in the axial direction are formed on the inner wall surface of the through hole 34k of the bonded magnet 34, and the resin 35 filled in the through hole 34k is engaged with the grooves 34l in a circumferential direction. Thus, rotation of the bonded magnet 34 with regard to the resin 35 can be prevented.

Further, the number of the grooves 34l is six. That is, the number is equal to or larger than the number of poles of the bonded magnet 34 (four poles). For this reason, even if the grooves 34l are not precisely positioned with regard to the bonded magnet 34, the grooves 34l are permitted to dispose inside the magnetic poles, respectively. That is, since there is no magnetic pole in which the groove 34l is not disposed in the magnetic poles, a problem that the intensities of the magnetic fields of the magnetic poles vary due to the influences of the grooves 34l will not easily occur.

Moreover, the groove 34l is formed so as to have an arc-shaped cross-section and does not have a sharp corner. Accordingly, when a molten resin 35 is pressed into (filled in) the through hole 34k of the bonded magnet 34, the pressure of the resin 35 does not converge on one point. For this reason, the bonded magnet 34 is not easily broken.

Further, in the rotor 30 of this embodiment, the resin 35 is formed in the shape of a cylindrical block around the roulette 31m that is formed at the end portion (right end position) of the shaft 31, as shown in FIG. 10. And, an axial end surface 35e of a resin block 35b is engaged with an axial end surface 34e of the bonded magnet 34 in the circumferential direction.

Figure 12:
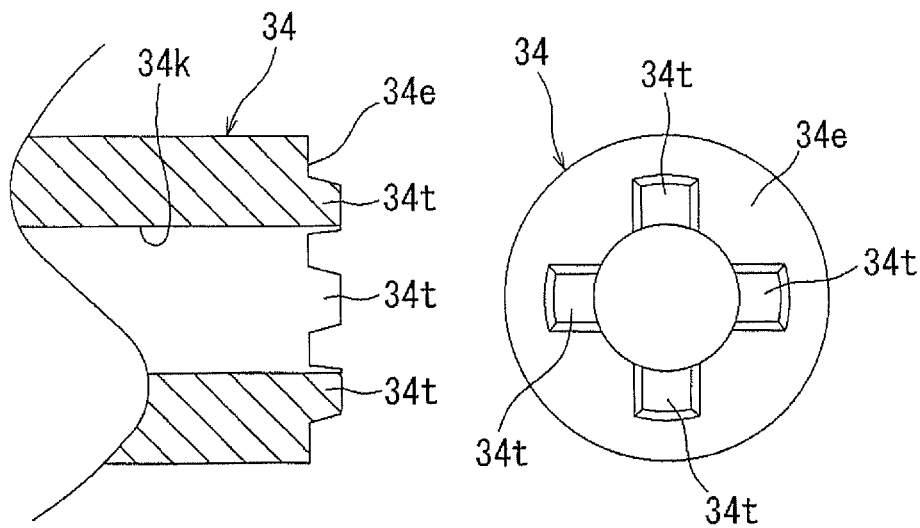
FIG. 12 shows a longitudinal sectional view and an end view of the bonded magnet.
Figure 13:
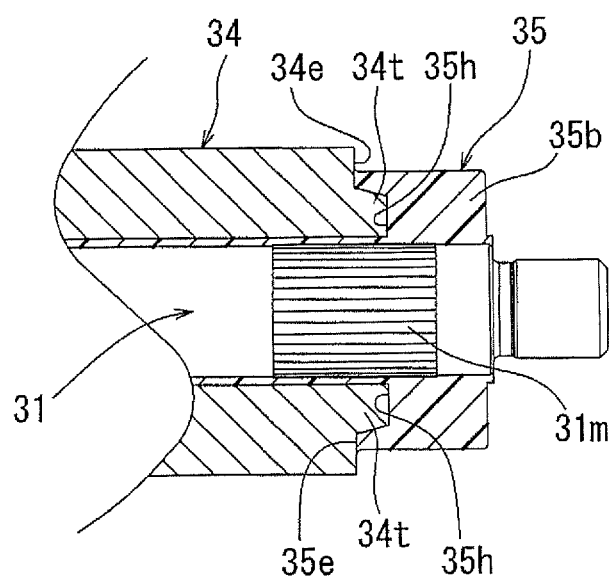
FIG. 13 is a longitudinal sectional view of the structure that prevents rotation of the bonded magnet.

That is, as shown in the longitudinal sectional view and the end view of the bonded magnet 34 of FIG. 12, four trapezoid protrusions 34*t* that extend in the axial direction are formed on the axial end surface 34*e* of the bonded magnet 34 at regular intervals in the circumferential direction. For this reason, when the resin block 35*b* around the shaft 31 is molded, there are formed recess portions 35*h* on the axial end surface 35*e* of the resin block 35*b* corresponding to the protrusions 34*t* of the bonded magnet 34 as shown in FIG. 13. That is, since the protrusions 34*t* of the axial end surface 34*e* of the bonded magnet 34 are engaged with the recess portions 35*h* of the axial end surface 35*e* of the resin block 35*b*, relative rotation of the bonded magnet 34 with regard to the resin block 35*b* can be prevented.

<Modifications>

Figure 14:
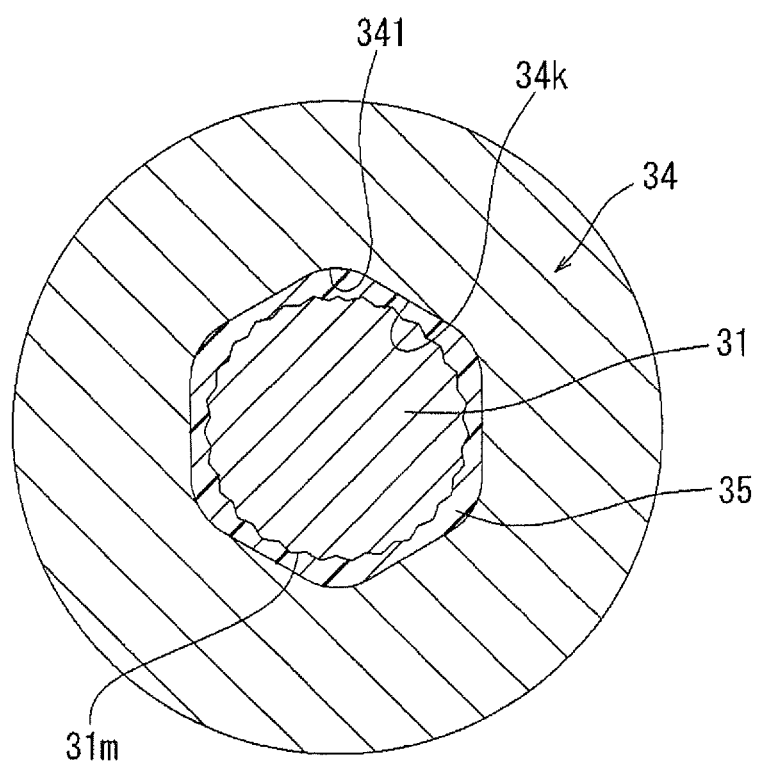
FIG. 14 is a cross-sectional view of a structure that prevents rotation of the bonded magnet according to a modified embodiment.

Here, the present invention is not limited to the above-mentioned embodiment, and may be modified without departing from the scope of the invention. The above example shows that the through hole 34*k* of the bonded magnet 34 is formed substantially in the shape of a flower so as to include the six grooves 34*l* having an arc-shaped cross-section as shown in FIG. 11. However, the through hole 34*k* of the bonded magnet 34 may be formed so as to have a hexagonal cross-section as shown in FIG. 14 and corner portions of the hexagonal cross-section may be smoothly chamfered to become the grooves 34*l* having an arc-shaped cross-section.

Figure 15:
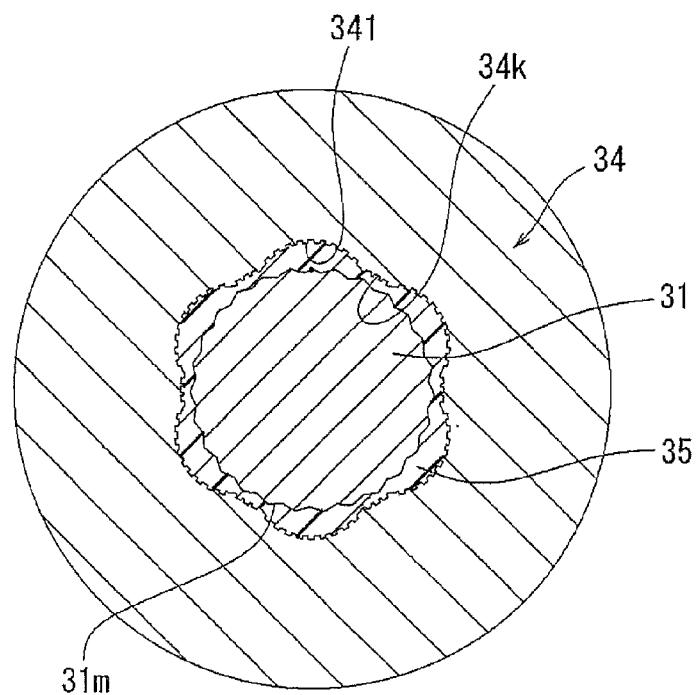
FIG. 15 is a cross-sectional view of a structure that prevents rotation of the bonded magnet according to a modified embodiment.

Further, the inner wall surface of the through hole 34*k* of the bonded magnet 34 may be shaped so as to be rougher than the outer peripheral surface of the bonded magnet 34 as shown in FIG. 15, which can also prevent rotation of the bonded magnet 34 with regard to the resin. This example shows that the through hole 34*k* of the bonded magnet 34 is formed substantially in the shape of a flower as shown in FIG. 15. However, the cross-sectional shape of the through hole 34*k* can be shaped arbitrarily while the inner wall surface of the through hole 34*k* is made rough. Preferably, the roughness of the inner wall surface of the through hole 34*k* of the bonded magnet 34 is configured to be 4a or more in the case where the roughness of the outer peripheral surface is approximately 1a (approximately 1 um) as centerline average roughness (Ra).

Figure 16:
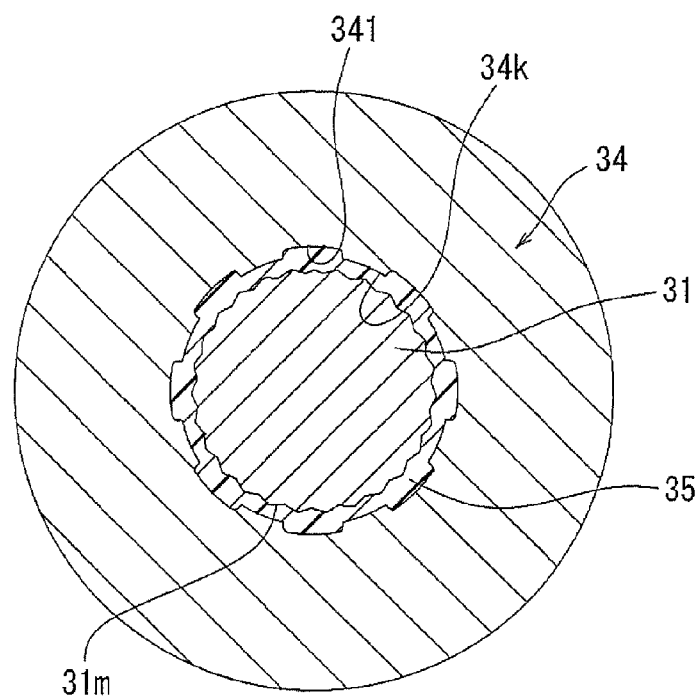
FIG. 16 is a cross-sectional view of a structure that prevents rotation of the bonded magnet according to a modified embodiment.

Further, the above example shows that the grooves 34*l* of the through hole 34*k* of the bonded magnet 34 are formed so as to have an arc-shaped cross-section. However, the grooves 34*l* may be formed substantially in a shallow square shape as shown in FIG. 16. When the grooves 34*l* are formed substantially in a shallow square shape as described above, it is ensured that the grooves 34*l* of the bonded magnet are easily engaged with the resin 35 in the circumferential direction and rotation of the bonded magnet with regard to the resin 35 is prevented.

Figure 17:
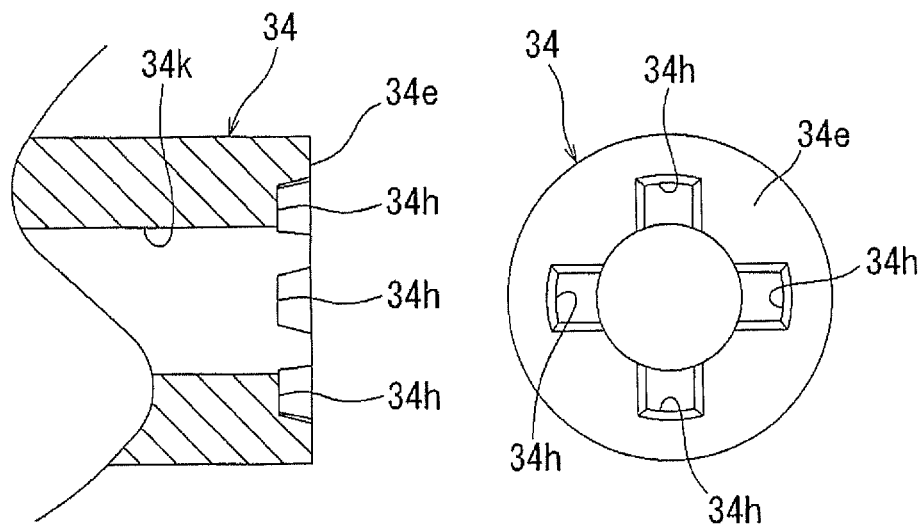
FIG. 17 shows a longitudinal sectional view and an end view of the bonded magnet according to a modified embodiment.
Figure 18:
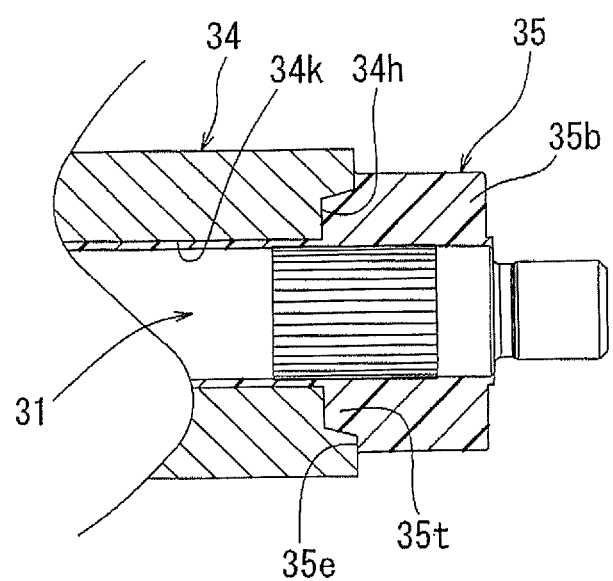
FIG. 18 is a longitudinal sectional view of the structure that prevents rotation of the bonded magnet according to a modified embodiment.

Further, the above example shows that the trapezoid protrusions 34*t* are formed on the axial end surface 34*e* of the bonded magnet 34 and the recess portions 35*h* with which the protrusions 34*t* of the bonded magnet 34 are engaged are formed on the axial end surface 35*e* of the resin block 35*b* (refer to FIG. 12 and FIG. 13). However, as shown in FIG. 17 and FIG. 18, trapezoid recess portions 34*h* may be formed on the axial end surface 34*e* of the bonded magnet 34 and protrusions 35*t* with which the recess portions 34*h* of the bonded magnet 34 are engaged may be formed on the axial end surface 35*e* of the resin block 35*b*.

Figure 19:
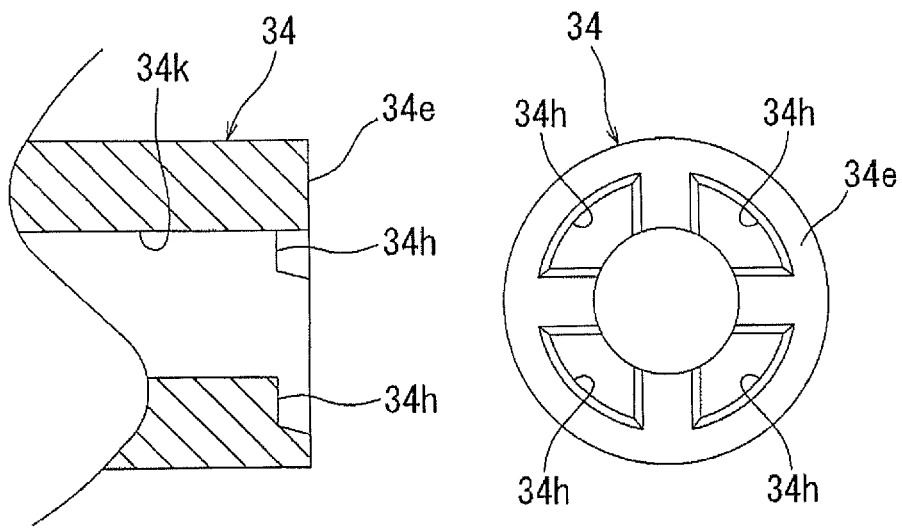
FIG. 19 shows a longitudinal sectional view and an end view of the bonded magnet according to a modified embodiment.
Figure 20:
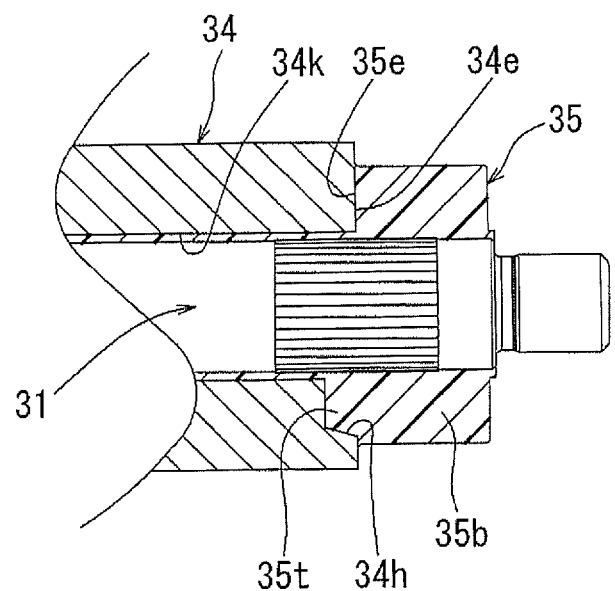
FIG. 20 is a longitudinal sectional view of the structure that prevents rotation of the bonded magnet according to a modified embodiment.

In addition, as shown in FIG. 19 and FIG. 20, the recess portions 34*h* of the axial end surface 34*e* of the bonded magnet 34 may be formed so as to have a fan shape in plan view and protrusions 35*t*, which are engaged with the recess portions 34*h* of the bonded magnet 34 and are formed so as to have a fan shape in plan view, may be formed on the axial end surface 35*e* of the resin block 35*b*. Accordingly, the engaging area of the recess portions 34*h* with the protrusions 35*t* increases, and thus it is further ensured that rotation of the bonded magnet 34 with respect to the resin block 35*b* is prevented.

Here, the above example shows that rotation of the bonded magnet 34 with respect to the resin 35 is prevented by use of the resin 35 filled in the through hole 34*k* of the bonded magnet 34 and the resin block 35*b*. However, it is also possible to prevent rotation of the bonded magnet 34 with regard to the resin 35, by only the resin 35 filled in the through hole 34*k* of the bonded magnet 34, or only the resin block 35*b*.

Further, the above embodiments 1 and 2 show that the brushless motor 20 for the electric power tool is used in the impact driver 10. However, the brushless motor 20 may be used in other electric power tools other than the impact driver 10.

EXPLANATION OF SYMBOLS

20 . . . brushless motor for an electric power tool
23 . . . stator
23*c* . . . drive coil (winding wire)
30 . . . rotor
31 . . . shaft
32 . . . core
34 . . . bonded magnet
34*k* . . . through hole
34*l* . . . groove
343 . . . groove
34*e* . . . axial end surface
35 . . . resin
35*b* . . . resin block
35*e* . . . axial end surface

What is claimed is:

1. A brushless motor for an electric power tool configured such that a rotor having a bonded magnet is radially disposed on the inner side of a stator having winding wires, wherein,
   the rotor includes a shaft and the bonded magnet that is radially disposed on the outer side of the shaft;
   a through hole into which the shaft is inserted is axially formed at the center of the bonded magnet;
   a resin is filled between an inner peripheral surface of the through hole and an outer peripheral surface of the shaft;
   an inner wall surface of the through hole of the bonded magnet and the outer peripheral surface of the shaft are shaped such that rotation of the shaft with respect to the bonded magnet is prevented through the resin;
   a plurality of grooves that extend in an axial direction are formed on the inner wall surface of the through hole of the bonded magnet in a circumferential direction;
   the number of the grooves is configured to be larger than the number of poles of the bonded magnet;
   a resin block that is integrally formed with the shaft and is provided on the outside of the shaft in the radial direction such that rotation of the resin block with regard to the shaft is prevented; and
   an axial end surface of the resin block has a plurality of first recesses and a plurality of first protrusions that are arranged in a circumferential direction, the first recesses and the first protrusions being alternately arranged, and further wherein an axial end surface of the bonded magnet has a plurality of second protrusions and a plurality of second recesses that are arranged in a circumferential direction, the second protrusions and the second recesses being alternately arranged, and further wherein by engaging the plurality of the first recesses and the plurality of the first protrusions with the plurality of the second protrusions and the plurality of the second recesses, respectively, the axial end surface of the resin block is configured to be engaged with the axial end surface of the bonded magnet in the circumferential direction.

2. The brushless motor according to claim 1, wherein the number of poles is configured to be eight or less.

3. The brushless motor according to claim 1, wherein the bonded magnet is magnetized so as to have polar anisotropy.

4. The brushless motor according to claim 1, wherein the through hole of the bonded magnet is formed so as to have a polygonal cross-section.

5. The brushless motor according to claim 1, wherein the bonded magnet is isotropic so as to be magnetized in any direction, being magnetized such that magnetic fields can be obtained in a direction perpendicular to an outer peripheral surface of the bonded magnet and in a direction perpendicular to an axial end surface of the bonded magnet.

6. The brushless motor according to claim 5, wherein:
the brushless motor further comprises a magnetic sensor that detects positions of magnetic poles of the rotor;
the magnetic fields in the direction perpendicular to the outer peripheral surface of the bonded magnet are used for driving the rotor and the magnetic fields in the direction perpendicular to the axial end surface of the bonded magnet are used for detecting the positions of the magnetic poles of the rotor;
the magnetic fields used for driving and detecting are magnetized such that each magnetic pole of the former magnetic fields has the same pole as each magnetic pole of the latter magnetic fields in a circumferential direction; and
the magnetic sensor is positioned at an end position of the stator in an axial direction.

7. The brushless motor according to claim 1, wherein:
the plurality of grooves are formed at regular intervals in a circumferential direction.

8. The brushless motor according to claim 1, wherein the grooves are formed so as to have an arc-shaped cross-section.

9. The brushless motor according to claim 1, wherein the grooves are formed so as to have a substantially square cross-section.

10. The brushless motor according to claim 1, wherein a depth of the groove is configured to be larger than 0.1 mm and smaller than 0.2X, X being a radius (mm) of the through hole of the bonded magnet.

11. The brushless motor according to claim 1, wherein the number of poles of the bonded magnet and the number of the groove are configured to be four and six, respectively.

12. The brushless motor according to claim 1, wherein surface roughness of the inner wall surface of the through hole of the bonded magnet is configured to be larger than that of the outer peripheral surface of the bonded magnet.

13. The brushless motor according to claim 1, wherein the shaft includes a first plurality of axially extending grooves and a second plurality of axially extending grooves, the first plurality of axially extending grooves and the second plurality of axially extending grooves being positioned at portions of the shaft opposing first and second ends of the magnet.

14. A brushless motor for an electric power tool configured such that a rotor having a cylindrical bonded magnet is radially disposed on the inner side of a stator having winding wires, wherein,
the rotor includes a shaft, a cylindrical core that is radially disposed on the outer side of the shaft and is made of a material through which magnetic flux easily passes, and the cylindrical bonded magnet that is radially disposed on the outer side of the core, and further wherein a thickness of the bonded magnet in the radial direction is configured to be larger than that of the core in the radial direction;
a through hole into which the shaft and the core are inserted is axially formed at the center of the bonded magnet;
a resin is filled between an inner peripheral surface of the through hole and an outer peripheral surface of the core;
an inner wall surface of the through hole of the bonded magnet and the outer peripheral surface of the core are shaped such that rotation of the core with respect to the bonded magnet is prevented through the resin;
a plurality of grooves that extend in an axial direction are formed on the inner wall surface of the through hole of the bonded magnet in a circumferential direction;
the number of the grooves is configured to be larger than the number of poles of the bonded magnet;
a resin block that is integrally formed with the shaft and is provided on the outside of the shaft in the radial direction such that rotation of the resin block with regard to the shaft is prevented; and
an axial end surface of the resin block had a plurality of first recesses and a plurality of first protrusions that are arranged in a circumferential direction, the first recesses and the first protrusions being alternately arranged, and further wherein an axial end surface of the bonded magnet has a plurality of second protrusions and a plurality of second recesses that are arranged in a circumferential direction, the second protrusions and the second recesses being alternately arranged, and further wherein by engaging the plurality of the first recesses and the plurality of the first protrusions with the plurality of the second protrusions and the plurality of the second recesses, respectively, the axial end surface of the resin block is configured to be engaged with the axial end surface of the bonded magnet in the circumferential direction.

15. The brushless motor according to claim 14, wherein the bonded magnet is magnetized so as to have polar anisotropy, and further wherein the bonded magnet is isotropic so as to be magnetized in any direction, being magnetized such that magnetic fields can be obtained in a direction perpendicular to an outer peripheral surface of the bonded magnet and in a direction perpendicular to an axial end surface of the bonded magnet.

16. The brushless motor according to claim 15, wherein:
the brushless motor further comprise a magnetic sensor that detects positions of magnetic poles of the rotor;
the magnetic fields in the direction perpendicular to the outer peripheral surface of the bonded magnet are used for driving the rotor and the magnetic fields in the direction perpendicular to the axial end surface of the bonded magnet are used for detecting the positions of the magnetic poles of the rotor;
the magnetic fields used for driving and detecting are magnetized such that each magnetic pole of the former magnetic fields has the same pole as each magnetic pole of the latter magnetic fields in a circumferential direction; and the magnetic sensor is positioned at an end position of the stator in an axial direction.

17. The brushless motor according to claim 14, wherein the through hole of the bonded magnet is formed so as to have a polygonal cross-section.

18. The brushless motor according to claim 14, wherein the plurality of grooves are formed at regular intervals in the circumferential direction.

19. The brushless motor according to claim 14, wherein the grooves are formed so as to have an arc-shaped cross-section.

20. The brushless motor according to claim 14, wherein the grooves are formed so as to have a substantially square cross-section.

21. The brushless motor according to claim 14, wherein a depth of the groove is configured to be larger than 0.1 mm and smaller than 0.2X, X being a radius (mm) of the through hole of the bonded magnet, and further wherein a surface roughness of the inner wall surface of the through hole of the bonded magnet is configured to be larger than that of the outer peripheral surface of the bonded magnet.

22. The brushless motor according to claim 14, wherein the number of poles of the bonded magnet and the number of the grooves are configured to be four and six, respectively.

23. The brushless motor according to claim 14, wherein the shaft includes a first plurality of axially extending grooves and a second plurality of axially extending grooves, the first plurality of axially extending grooves and the second plurality of axially extending grooves being positioned at portions of the shaft opposing first and second ends of the magnet.

* * * * *